United States Patent
Rivas Garay et al.

(10) Patent No.: US 8,650,054 B2
(45) Date of Patent: Feb. 11, 2014

(54) INTERNAL YIELD ADJUSTMENT RETRIEVAL FROM REVENUE ACCOUNTING

(75) Inventors: Sergio Rivas Garay, Cagnes S/Mer (FR); Paola Ruo Rui, Antibes (FR); Patrice Ambolet, Valbonne (FR); Aurélien Pioger, Antibes (FR)

(73) Assignee: Amadeus S.A.S., Sophia Antipolis (FR)

( * ) Notice: Subject to any disclaimer, the term of this patent is extended or adjusted under 35 U.S.C. 154(b) by 53 days.

(21) Appl. No.: 13/343,986

(22) Filed: Jan. 5, 2012

(65) Prior Publication Data

US 2013/0166328 A1    Jun. 27, 2013

(30) Foreign Application Priority Data

Dec. 21, 2011  (EP) ..................................... 11306732

(51) Int. Cl.
*G06Q 10/00* (2012.01)
(52) U.S. Cl.
USPC ............................................. 705/5; 705/1.1
(58) Field of Classification Search
USPC ....................................................... 705/1.1, 5
See application file for complete search history.

(56) References Cited

U.S. PATENT DOCUMENTS

| 5,255,184 | A * | 10/1993 | Hornick et al. ................... 705/6 |
| 6,263,315 | B1 * | 7/2001 | Talluri ......................... 705/7.12 |
| 2004/0230472 | A1 * | 11/2004 | Venkat et al. ................... 705/10 |
| 2009/0063219 | A1 * | 3/2009 | Raufaste et al. .................. 705/7 |
| 2009/0063220 | A1 * | 3/2009 | Raufaste et al. .................. 705/7 |
| 2010/0145740 | A1 | 6/2010 | Claverie et al. ................... 705/5 |
| 2011/0282701 | A1 * | 11/2011 | Reiz ................................. 705/5 |
| 2012/0089476 | A1 * | 4/2012 | Walker et al. ................ 705/26.4 |
| 2013/0024217 | A1 * | 1/2013 | Pradignac et al. ................ 705/5 |

FOREIGN PATENT DOCUMENTS

| WO | WO 2009/030623 | 3/2009 |
| WO | WO 2010/097441 A1 | 9/2010 |

* cited by examiner

*Primary Examiner* — Shannon Campbell
(74) *Attorney, Agent, or Firm* — Wood, Herron & Evans LLP

(57) ABSTRACT

Disclosed is a computer-implemented method and system to perform a travel-related Availability Computation. The method includes, at an Inventory System, initiating an Availability Computation by retrieving information relevant to a received availability computation inquiry; determining that portion of a travel solution that corresponds to a reference carrier and a context to be prorated; making a call to a Proration Service and providing the Proration Service with applicable context information; receiving from the Proration Service proration information comprised of a calculated adjusted Yield or a calculated adjustment factor to be applied to the Yield, the Proration Service using proration data that is maintained by a Revenue Accounting System to make the calculation; and completing the Availability Computation using the adjusted Yield or the adjustment factor to be applied to the Yield.

20 Claims, 5 Drawing Sheets

INTERNAL YIELD ADJUSTMENT RETRIEVAL FROM REVENUE ACCOUNTING

TECHNICAL FIELD

The exemplary embodiments of this invention relate generally to computerized travel reservation systems and methods and, more specifically, relate to techniques for making interline adjustments to yield values when making an availability computation.

BACKGROUND

Certain terms used in the following description are defined as follows:

Leg: A non-stop journey between a "departure" station and an "arrival" station.

Segment: One or more legs, sharing the same commercial transportation service (such as a flight) number. A segment is a saleable product.

Interline segment: A segment which is operated or marketed by a carrier (such as an airline) other than a current reference carrier (such as another airline).

Validating carrier: In the context of a multi-leg transportation service, the validating carrier (also known as an issuing carrier) is the carrier that validates or issues tickets, and the carrier that receives money when transportation service (such as a flight) is booked.

Cabin: Physical section of an aircraft, such as First Class or Economy.

IATA International Air Transport Association

ICH IATA Clearing House—The IATA Clearing House provides a service for on-time settling of interline accounts between the world's airlines, airline-associated companies and Travel Partners.

ATO/CTO Airport Ticket Office, City Ticket Office

Bid Price The Bid Price is the minimum revenue at which a carrier wishes to sell a given seat. As far as air travel is concerned, it is a net value (Bid Price) for an incremental seat on a particular flight/leg/cabin in the airline network. The Bid Price can be considered as the marginal value of a given flight/cabin/leg, also referred to as minimum acceptable net revenue, hurdle price, shadow price, displacement cost, or dual cost. The lowest Bid Price amongst the ones defined for the unsold seats in a given leg/cabin is referred to as the Current Bid Price.

Yield The monetary value that an airline associates to a given O&D. Yields are computed based on historical fare data and used to estimate how much revenue the airline would gain from the sale of a ticket. The higher the Yield the higher is the revenue realized by the carrier. A product is defined by several criteria such as the O&D of the passenger, the booking class, the Point of Sale and so forth. The main difference between Yields and Fares is that Yields are average revenues used by the RMS to compute demand and optimize the network, and Fares are used by the Reservation system to price tickets.

O&D Origin and Destination

RMS Revenue Management System—System that calculates and provides inventory controls to Inventory and gathers statistics. This system may also be called the Optimiser.
The RMS determines forecasts of demand for future flights based on statistical historical data and provides results of optimization in terms of inventory controls to be applied to the flight date inventory, in order to maximize the revenue generated by the future flight.

Inventory System The computer system enabling an airline to manage the distribution of its flights, the selling of space and the delivery of related services, such as seating SPA Special Prorate Agreement—A separate, bilateral agreement between the parties participating in the proration. An SPA defines a different proration methodology than what is specified by the MPA and, when applicable, has the priority on Proviso and SRP.

SRP Straight Rate Proration—The default approach to proration, in which the fare is split pro-rata to weighted mileage. Mileage is weighted to take account of the additional costs of short-haul flights (this varies by world region), with the weighted mileage known as "prorate factor miles". Each segment between two cities has a prorate factor (PF) computed with TPM being the IATA Ticketed Point Mileage data between the two cities, and an Area-WeightFactor taken from the PMP (Prorate Manual Passenger):

$PF = WeightFactor \cdot TPM \cdot Area\ WeightFactor$ $WeightFactor = 10.316829 \cdot TPM^{-0.265253}$ (This formula is provided simply for informational purposes and is subject to change).

Proviso An exception to the straight-rate proration rule. It is possible for a carrier to specify a "proviso", or fixed revenue amount, for its part of the journey, where the revenue under straight-rate proration may not cover selling and operating costs (which are nonlinear in distance). For this reason, provisos are generally applied to the shorter portion of an itinerary (and in any case are restricted to sectors under 1700 miles). Provisos are applied by carriers within the MPA, but the agreement imposes rules which mean that in some circumstances, the proviso does not apply, and the calculation reverts to straight-rate proration. The most important situation preventing a proviso from being applied is the "minimum prorate rule". This states that if the residual amount (i.e. the amount of the through fare, less the proviso) is less than a threshold value, then straight-rate proration will be used.

MPA Multilateral Prorate Agreement—An agreement filed by IATA for the division, or "proration" of the revenue from a fare specified between an origin airport and a destination airport, where the journey involves travel on more than one carrier. It applies to international through fares and charges, and domestic through fares and charges either sold separately or in conjunction with international fares for passenger transportation and excess baggage.

Coupon A coupon is a ticket part associated to each segment. It is constituted of various fields such as boarding and de-planing points, the departure date, the flight number, the booking class and the prorated price.

Ticket A ticket is a set of coupons (usually from 1 to 16 coupons), and is associated with a unique identification number, the ticket ID. A ticket contains various fields such as the Point of Sale, the issuance date, the passenger type and the total price.

In the field of the travel industry, when a passenger or a travel agent books an itinerary the request follows the sequence shown in the high level diagram presented in FIG. 1. The travel agent or the web agent sends the sell request to a Global Distribution System 10 which in turn forwards it to a carrier's reservation system 12. The reservation system 12 requests real time Availability from an inventory system 14 of the carrier. The inventory system 14 computes the Availability using booking figures and controls received from a carrier's revenue management system (RMS) 16. If there is sufficient Availability the sell request is accepted and the reservation system 12 prices and tickets the itinerary in cooperation with a ticketing system 20. The priced itinerary is sent to a revenue accounting system 22 which gathers all of the information regarding the operating segments and the revenue earned. The revenue accounting system spreads (prorates) the revenue among the different segments, which can be operated by different carriers. This is true even if all segments are operated by the same carrier, as information is needed as how much revenue a given segment represents. A pricing system 24 can be included and connected with the reservation system 12.

Of particular interest herein is a subpart of the real time Availability Computation process done on Inventory side. The Availability Computation is done using revenue controls provided by the carrier's RMS 16, which forecasts demand and optimizes the carrier's revenue by optimizing its network, and provides the yields associated with a seat in the given booking class. Once the RMS 16 has optimized the carrier's network, the RMS 16 sends the bid prices associated with each flight date. Bid prices are the representation of the expected revenue for the $n^{th}$ seat in the given flight and cabin.

Yields and Bid Prices are used by the airline's inventory to compute an Availability to grant to a given booking class in a given context.

There is now a tendency for carriers to compute the Availability taking into account contextual information available at the reservation system 12. This is possible due to the introduction of, as non-limiting examples, Journey Data (segments already booked in the same record) and some SSR (Special Service Request). In addition other factors can be considered such as point-of-sale (POS), point of journey commencement, etc. Using the contextual information carriers can ensure that they always use the maximum available information to compute the Availability and make sell decisions.

Following this trend and due at least in part to the introduction of journey data in an availability polling request or sell request the inventory system 14 is capable of readily identifying interline context from travel solutions. As the price paid by the passenger for an interline travel solution is spread among the participating carriers, these can reflect this spread of revenue in the Availability Computation process, thereby adapting the Availability depending on those carriers operating the travel solution.

One technique to do this is to modify the Yield according to the context of the request.

The Yields and Yield modifiers definition can change based on the carrier's strategy. For example, one carrier can include the modifiers in the generated Yield values while another carrier can define modifiers to be applied in real time according to the request context. In this last approach, applying the modifiers in real time, at least two primary strategies can be followed. In a first strategy a carrier can use Yields defined over the operating part of the travel solution only, and then apply interline modifiers depending on the connecting carriers. In a second strategy a carrier can define Yields at the same level as the travel solution requested by the passenger, i.e., including all segments, even those not operated by the reference carrier, and then applying interline adjustments on these Yields.

Several algorithms have been implemented to modify/adapt Yields according to the context, mileage based algorithms and possibly some user defined adjustments. However, the result is basically an approximation of what is actually performed by the revenue accounting system 22 with the price paid for the ticket. At the revenue accounting system 22 there can be least three kinds of interline price adjustment: Straight Rate Proration (SRP), Provisos and Special Prorate Agreements (SPA). Note that these are exemplary and non-exhaustive possible types of adjustments.

Provisos are fixed values defined by IATA that are intended to protect the revenue of those carriers operating short-haul transportation service connecting with long-haul transportation services. The price proration is done using the fixed values for the segments in the travel solution, if defined.

The Special Prorate Agreements (SPA) are private agreements between two carriers willing to share revenue under specific conditions; and for those cases covered by the SPA the SPA defines how to share the revenue between the two airlines.

Another solution is to generate Yields and adjustments on a carrier's Revenue Management System using historical data from the revenue accounting system where the coupons are prorated. These adjustments can be generated using historical data (i.e., tickets already prorated) and not dynamically.

One significant issue that can arise using the conventional approaches for yield adjustment is that the same travel solution can have completely different proration solutions when considering the Availability Computation process and the Revenue Accounting process.

While several kinds of Yield modifiers can be used, of most interest herein are real time interline modifiers. The application of Yield modifiers has an immediate impact on the computed Availability.

As an example, assume that two segments between points A-B-C are operated by carriers 1 (C1) and 2 (C2), with C1 being the validating carrier. Within this context these two carriers have an agreement of revenue sharing (SPA) for this context of 25%-75%, but based on the mileage for these two segments the proration is 15%-85%. The inventory system of carrier C2, to compute the Availability, will apply the SRP algorithm (based on mileage), and so will apply a Yield modification of 15%-85% on Yields, expecting that later, once the ticket is priced and the revenue shared, the revenue will be prorated in the same way. However, the revenue is actually shared following the SPA between the two carriers, and thus carrier C2 only receives 75% of the total revenue (not 85%). In this case the inventory system of carrier C2 will grant more Availability for less revenue and, as a result, C2 will suffer most likely a loss of revenue.

Commonly owned WO9200903623 A1 describes the interaction between ticketing system and revenue accounting in real time, and discusses the interaction of two revenue accounting systems willing to agree on a revenue sharing arrangement in real time (at ticketing time). This technique does not bear at all on the Availability Computation process.

SUMMARY

The foregoing and other problems are overcome, and other advantages are realized, in accordance with the embodiments of this invention.

In accordance with a first aspect of the exemplary embodiments there is provided a computer-implemented method to perform a travel-related Availability Computation. The method comprises, at an Inventory System, initiating an Availability Computation by retrieving information relevant to a received availability computation inquiry; determining the portion of a travel solution that corresponds to a reference carrier and a context to be prorated; making a call to a Proration Service and providing the Proration Service with applicable context information; receiving from the Proration Service proration information comprised of a calculated adjusted Yield or a calculated adjustment factor to be applied to the Yield, the Proration Service using proration data that is maintained by a Revenue Accounting System to make the calculation; and completing the Availability Computation using the adjusted Yield or the adjustment factor to be applied to the Yield.

In accordance with a further aspect of the exemplary embodiments there is provided a computer-implemented travel reservation and booking system. The system comprises a Proration Service; an Inventory System comprising an Availability Computation Engine, a Revenue Accounting System comprising a Referential Data Server that stores proration data including proration rules and agreements and an integration path coupled between the Inventory System and the Revenue Accounting System. The system is configured to operate so as to initiate at the Availability Computation Engine an Availability Computation in response to receiving an Availability Computation Inquiry, to retrieve information relevant to the received Availability Computation Inquiry; to determine a portion of a travel solution that corresponds to a carrier and a context to be both prorated; to make a call to a Proration Service and provide the Proration Service with applicable context information; and to receive from the Proration Service proration information comprised of a calculated adjusted Yield or a calculated adjustment factor to be applied to the Yield, where the Proration Service uses the proration data to make the calculation. The Availability Computation Engine completes the Availability Computation using the adjusted Yield or the adjustment factor to be applied to the Yield.

BRIEF DESCRIPTION OF THE DRAWINGS

The foregoing and other aspects of the embodiments of this invention are made more evident in the following Detailed Description, when read in conjunction with the attached Drawing Figures, wherein.

DETAILED DESCRIPTION

Figure 1:
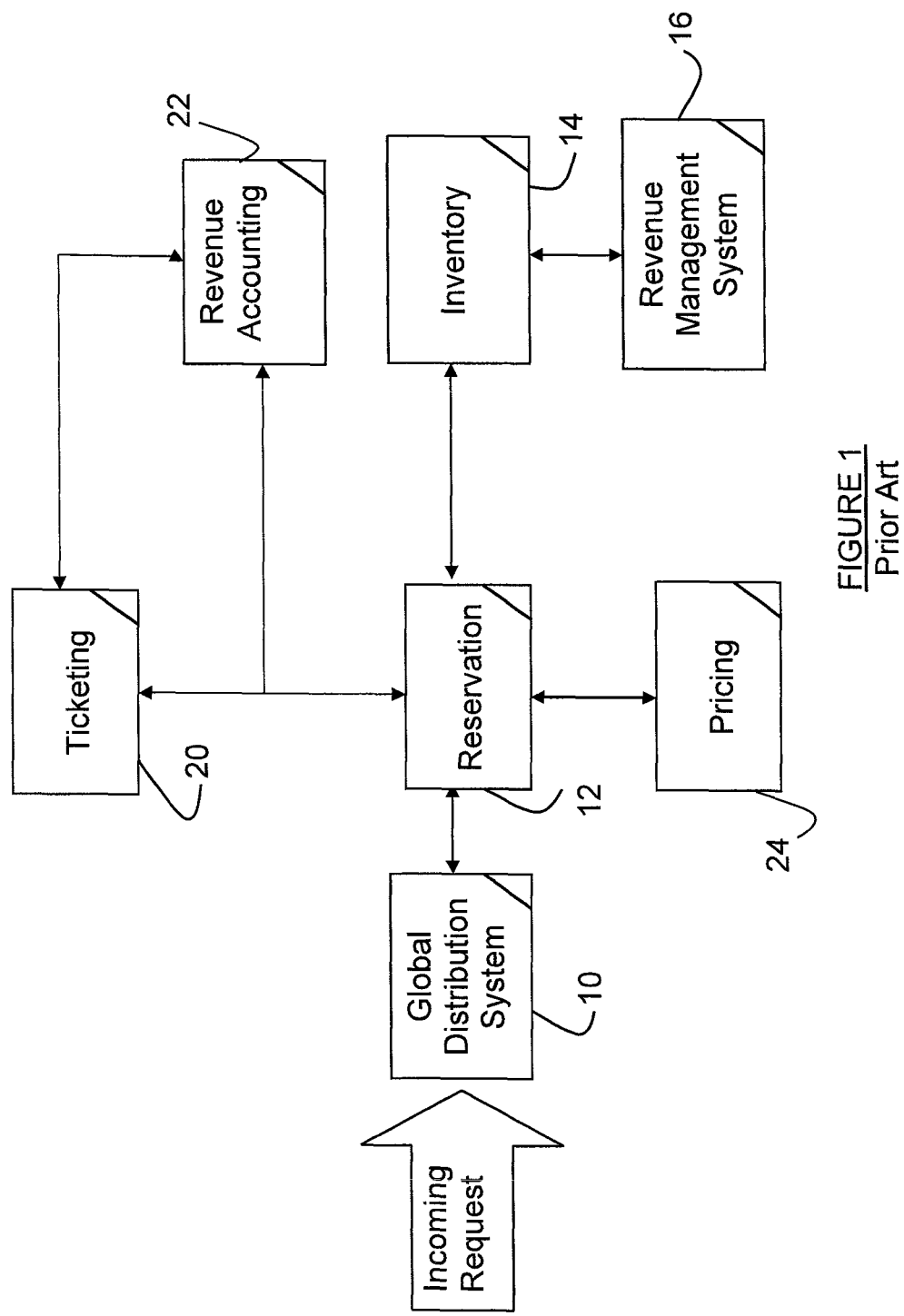
FIG. 1 is a high level block diagram of a conventional process flow and system that responds to an itinerary availability polling request or sell request.

Before describing in detail the invention in accordance with preferred embodiments various non limiting options the invention may comprise are given hereafter:

the reference carrier can possibly be a validating carrier;
the availability computation inquiry is one of an availability polling request and a sell request, and the applicable context information provided to the Proration Service is comprised of at least some of:
an itinerary;
a booking class, per flight segment;
any applicable special service request information;
a point of sale;
a Yield corresponding to the itinerary; and
the validating carrier.
the proration information that is received from the Proration Service is comprised of:
a percentage to be applied to each flight segment; and
an absolute value related to each flight segment value, if the Yield is present in the context information provided to the Proration Service;
said Proration Service computes, using the context received from the Inventory System, a final yield corresponding to the operating carriers by:
applying Straight Rate Proration on the Yield and providing a percentage and segment value deduced from the Yield;
applying Provisos based on the itinerary information and the Yield; and
applying a Special Prorate Agreement, if applicable, based on the context.
Said Proration Service computes the proration information using a Fare quotation returned by an informative pricing inquiry and the context information received from the inventory System, enabling fare information to be more accurate for matching of Provisos and a Special Prorate Agreements, if applicable, and to consider a presence of a Special Service Request, if applicable, and provides a percentage of the fare assigned to each segment;
said Proration Service uses referential data effective at the time of the availability computation inquiry;
the referential data is obtained from a Referential Data Server that also stores applicable proration rules and agreements;
the Proration Service comprises a part of the Inventory System, and is connected to the Referential Data Server via a path established between the Inventory System and the Revenue Accounting System;
making a call is performed in real time upon receipt of the Availability Computation inquiry;

A proration operation performed at the Revenue Accounting System is in general the most detailed and accurate since the Revenue Accounting System has access to and maintains all of the proration algorithms used by the carrier, as well as having access to the proration agreements or rules defined by the carrier that are valid at issuance time. The exemplary embodiments of this invention enable access to the proration process in the Revenue Accounting System from the Availability Computation process in the Inventory System so as to have only one proration algorithm applied in both processes, thereby improving the Yield adjustment for the Availability Computation.

The use of the embodiments of this invention improves the accuracy of a Yield adjustment for groups of carriers that use real time Availability Computation, and makes the Yield adjustment due to interline contexts more closely resemble the actual spread of revenue performed by the revenue accounting system 22.

As considered herein an Availability Computation Engine is initiated to perform an Availability Computation in response to receiving an Availability Computation Inquiry. An Availability Computation Inquiry can non limitatively be an Availability Polling Request or a Sell Request.

The exemplary embodiments of this invention provide a novel and enhanced method to prorate Yields and integrate the functionality of the carrier's Revenue Accounting System 22 and Inventory System 14 in real time. This integration is depicted by the (data) path 26 connecting the Revenue Accounting System 22 and Inventory System 14 in FIG. 2. This novel integration path 26 enables Yields associated with interline travel and proration rules and agreements to be accurately determined and then used for making an Availability Computation, and to accurately reflect the price paid by the passenger and that is shared among the operating carriers of the travel solution.

The exemplary embodiments of this invention provide a novel and enhanced method to prorate Yields during the Availability Computation process using revenue controls, when the travel solution requested is operated by two or more carriers.

The exemplary embodiments of this invention provide a novel architecture for Availability Computation, allowing the process to access in real time the revenue accounting information of the carrier to retrieve a Yield modification factor or a modified Yield. A proration engine having access to the revenue accounting system 22 prorates the travel solution requested using the applicable proration rules defined by the carrier (e.g., SPA, Proviso, SRP, etc.).

Conventionally the Inventory System 14 and the Revenue Accounting System 22 are independent systems that operate with different kinds of information: fares and taxes for the Revenue Accounting System 22 and Yields for Inventory System 14. In accordance with this invention the Inventory System 14 and the Revenue Accounting System 22 interface in real time via the integration path 26 so that the Availability Computation process can benefit from the use of an applicable proration algorithm at the Revenue Accounting System 22 and to apply same to Yields thereby providing a more accurate Availability Computation.

In one approach the Revenue Accounting System 22 would need to be able to respond in real time to some thousands of requests per second. The Availability Computation is a scalable module that always computes the Availability in real time. However, the Revenue Accounting System 22 is typically not designed to be this dynamic as it normally receives fewer transactions per day than does the Inventory System 14. Further, the scalability of the Revenue Accounting System 22 may be an issue in some deployments as the Revenue Accounting System 22 may not be designed to handle possibly thousands of requests per second. The needed dynamic operation of the Revenue Accounting System 22 is accommodated in this invention in one embodiment by embedding a proration service from the Revenue Accounting System 22 into the Inventory System 14, more precisely in the Availability Computation process of the Inventory System 14.

The exemplary embodiments of this invention thus enable the creation of an interaction between two independent systems, i.e., between the Inventory System 14 and the Revenue Accounting System 22. As was noted above, these two systems are normally completely independent and operate with different units of data. The Revenue Accounting System 22 typically uses fares/taxes and financial data while the Inventory System 14 uses Yield values. The exemplary embodiments interface these two disparate systems in a novel manner to achieve a fully integrated Availability Computation. One exemplary implementation model embeds a revenue accounting service in the Inventory System.

The exemplary embodiments of this invention further enable Yield proration at the Revenue Accounting System 22. In accordance with an aspect of this invention the Inventory System 14 sends the Yield and the context to the Revenue Accounting System 22, and the Revenue Accounting System 22 performs the proration using the available and applicable algorithms (defined by the carrier or IATA standards) and returns the modified value of the Yield corresponding to that part of the travel solution being operated by the reference carrier (or returns an adjustment factor). The reference carrier can be any of the carriers participating to the flight.

The exemplary embodiments of this invention further enable the Revenue Accounting system 22 to be accessed in real time. As was noted above there could be an issue related to the scalability of the Revenue Accounting System 22, as it may not be designed or intended to operate as a scalable module to absorb volumes of Availability Polling and Sell Requests. The exemplary embodiment provides an adaptation of the revenue accounting processes to apply proration in real time for all requests requiring an Availability Computation. For example, a proration service module can be embedded in the Availability Computation process to absorb the load and the traffic and make the proration calculations.

The embodiments of this invention improve the Yield adjustment functionality using more accurate tools to approach as close as possible to the final proration of revenues using contextual information that can influence the pricing, for example, segments operated by other carriers and special service requests.

To accomplish this goal the Inventory System 14 accesses in real time a proration service controlled by the Revenue Accounting system 22 of the carrier that prorates Yields or provides adjustment factors for a given context. The Inventory System 14 accesses the proration service each time the Availability Computation process is requested.

Figure 3:
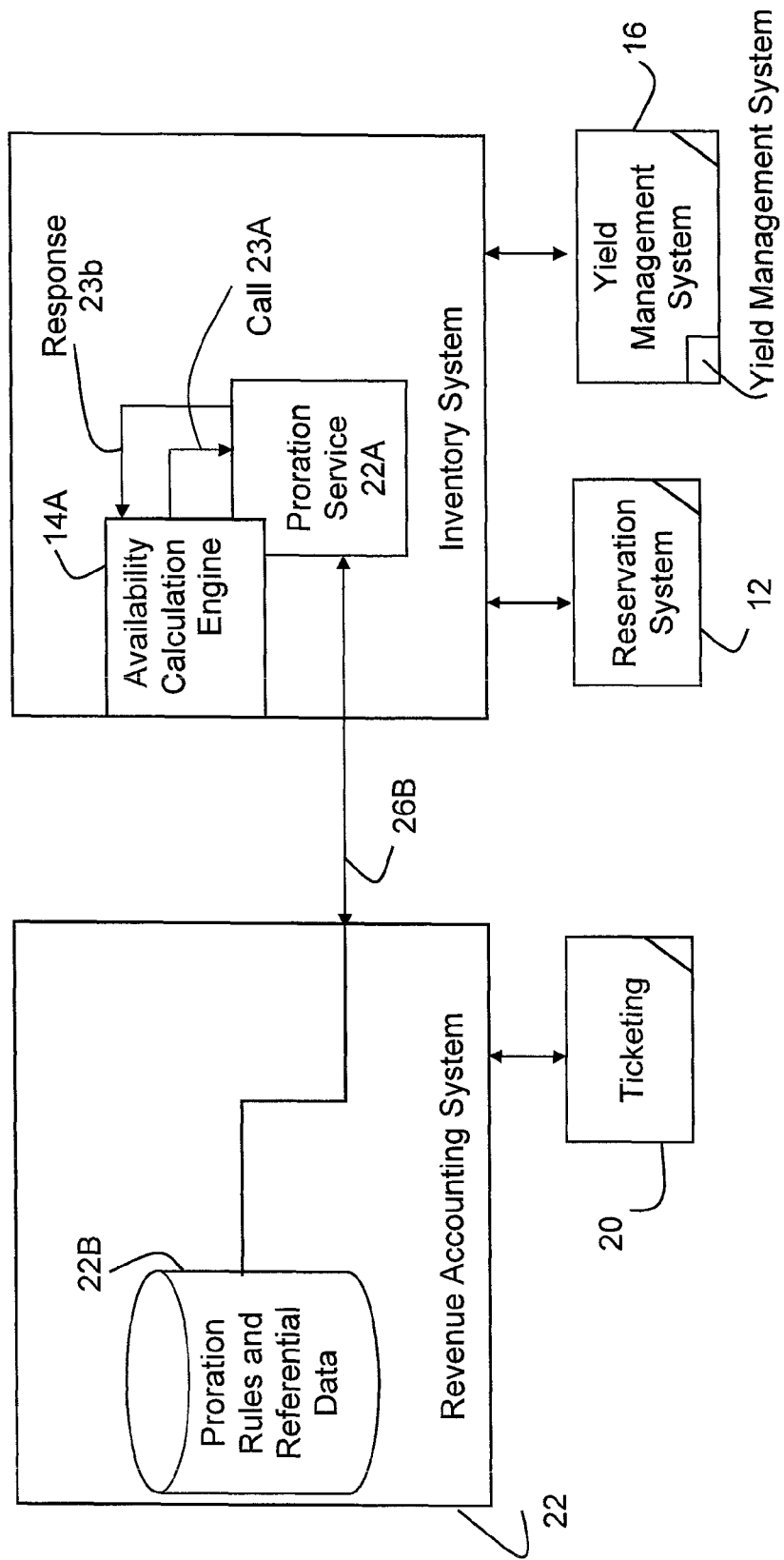
FIG. 3 shows an exemplary embodiment where the Proration Engine or Service is included (embedded) or otherwise connected with the Availability Computation Engine of the Inventory System, and is interfaced with a Referential Data Server of the Revenue Accounting System via the path shown in FIG. 2.

An overall description of this process is as follows. Reference can be made to FIG. 3. In this embodiment the Proration Service 22A is connected via the path 26B with the Referential Data Server 22B that stores the applicable proration rules and referential data used during the proration process.

In operation the inventory System 14 initiates an Availability Computation by retrieving all relevant information of the Availability Computation Inquiry (e.g., segments already reserved in the same record, etc). With this information the Inventory System 14 determines that portion of the travel solution that corresponds to the reference carrier and the context to be prorated. A Call 23A for a Yield modification is made, via the interface 26A in FIG. 3A, to the Proration Service 22A. In order to be able to perform proration request the Proration Service 22A is provided with the following input data (ID):

ID_1) Itinerary known at time of Availability Computation Inquiry
ID_2) Per segment, the booking class
ID_3) An indicator that indicates the presence of a Special Service Request infant or child
ID_4) The point of sale
ID_5) The Yield corresponding to the itinerary provided at (1). Note that input data is optional.
ID_6) The validating carrier or provider (derived from ATO/CTO office identification or, directly provided in the PNR. It is needed for the SPA).

Based on this input data the Proration Service 22A provides response data (RD) in a Response 23B:

RD_1) The percentage to be applied to each flight segment
RD_2) The absolute value related to each segment value (if the Yield is provided in the input)

Figure 4A:
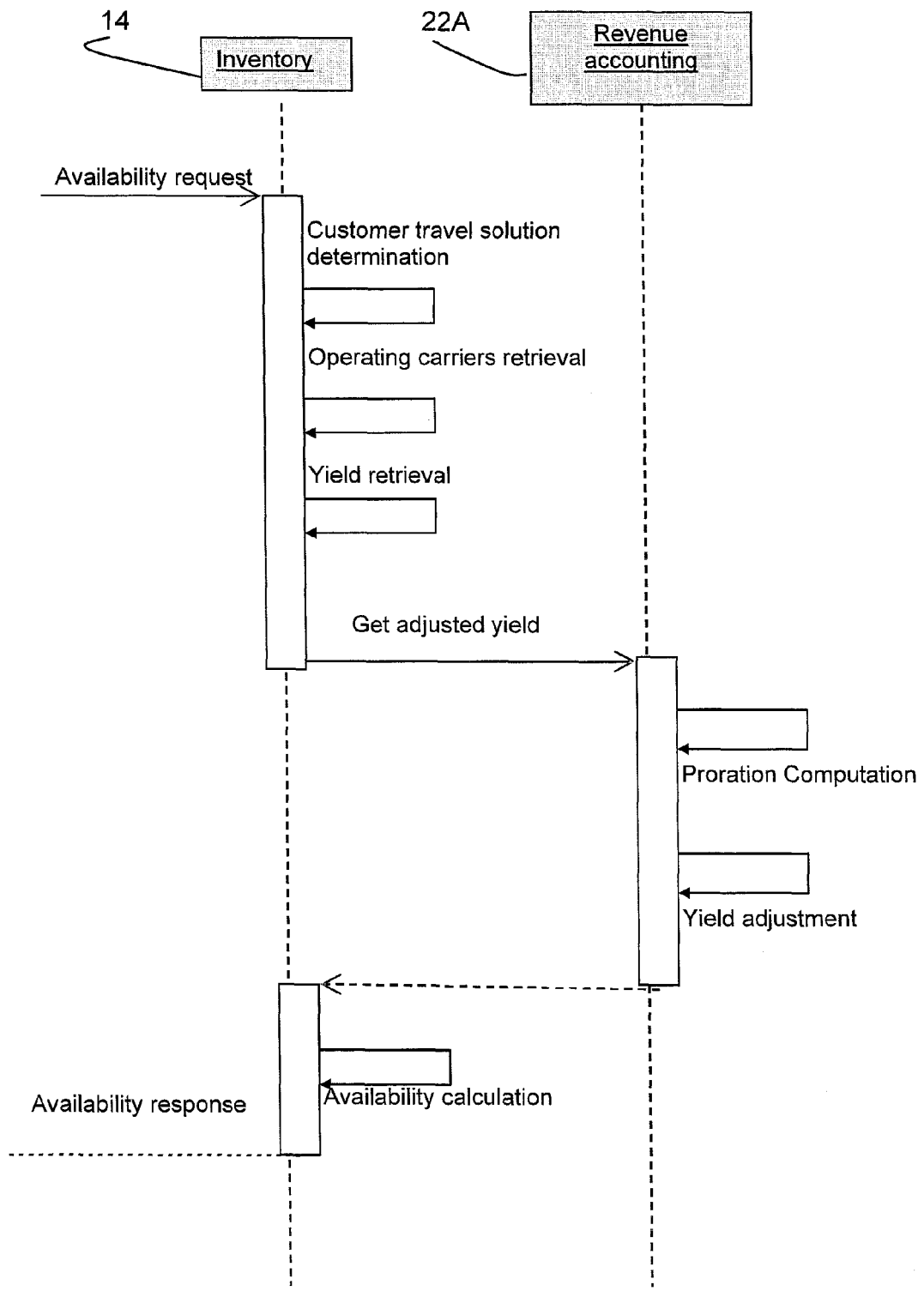
FIG. 4A depicts an Availability Computation process in accordance with a first embodiment (Option A), where the Proration Service returns an adjusted Yield.

In real time the Proration Service 22A computes, using the context received from the Inventory System 14, the yield and that part of the yield corresponding to the operating carriers according to one of the two Options A and B described below.
Option A, See FIG. 4A For Option A, the Proration Service 22A relies only on the input given at Availability Computation Inquiry time (the time that the availability polling request or the sell request is made to the Inventory System 14), and based on this input operates as follows.

A) The Proration Service 22A applies SRP on the Yield and provides a percentage and segment value (deduced from the Yield considered as the fare component corresponding to the entire itinerary, even if this would not be potentially the case if a pricing was done). The yield value used by the Proration Service 22A might therefore not be the price value that would be returned by the system in a ticketing flow. The yield value may be an estimate of what could be a final price value done by the Pricing System 24 at booking time.

B) The Proration Service 22A applies provisos based on itinerary information. In this case the proviso is an estimate only since not all information of the ticket is present at Availability Computation Inquiry time. Note that the applicability of the provisos processing is based on the Yield provided in the input data, since no fare information will be present, and not all geographical conditions can be matched without the fare amount to be prorated, and the fare type is assumed to be: Adult, Normal Fare).

Figure 4B:
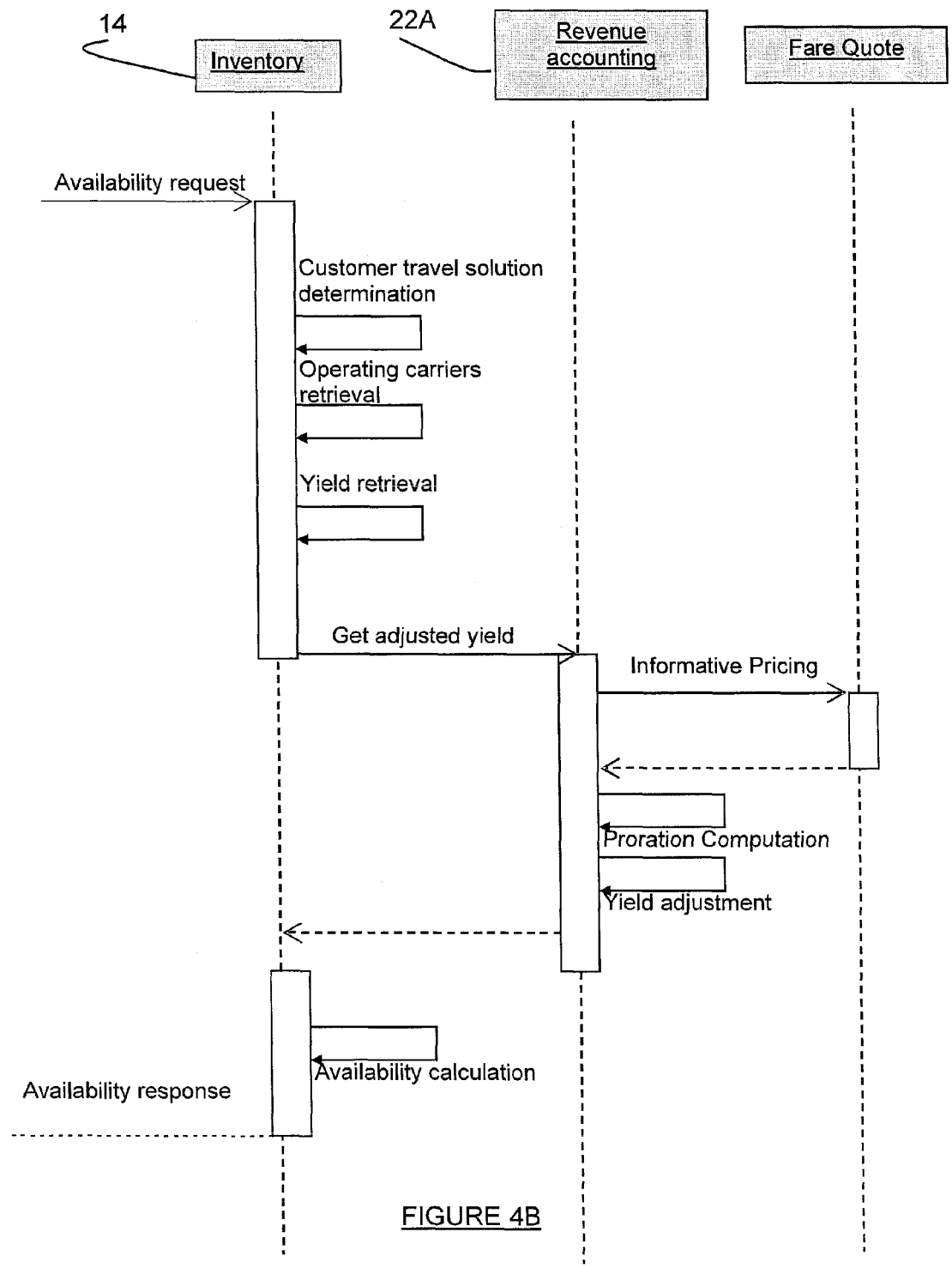
FIG. 4B depicts an Availability Computation process in accordance with a second embodiment (Option B), where the Proration Service returns an adjusted Yield using informative pricing.

C) The Proration Service 22A applies SPA based on criteria available in the input data.
Option B, See FIG. 4B For Option B the Revenue Accounting System 22 attempts an informative pricing based on information received in the input data so it can obtain a fare calculation line, allowing the fare information to be more accurate for the matching of the provisos and SPAs. It can be noted that the Revenue Accounting System 22 uses a flag related to the presence of an SSR to attempt to price with specific fare options for infant and child. This informative pricing in any case will be an estimate of the final price of the itinerary.

Based on this information the Proration Service 22A is able to prorate according to a fare returned in an informative pricing inquiry and provide the percentage of the fare assigned to each segment.

Figure 2:
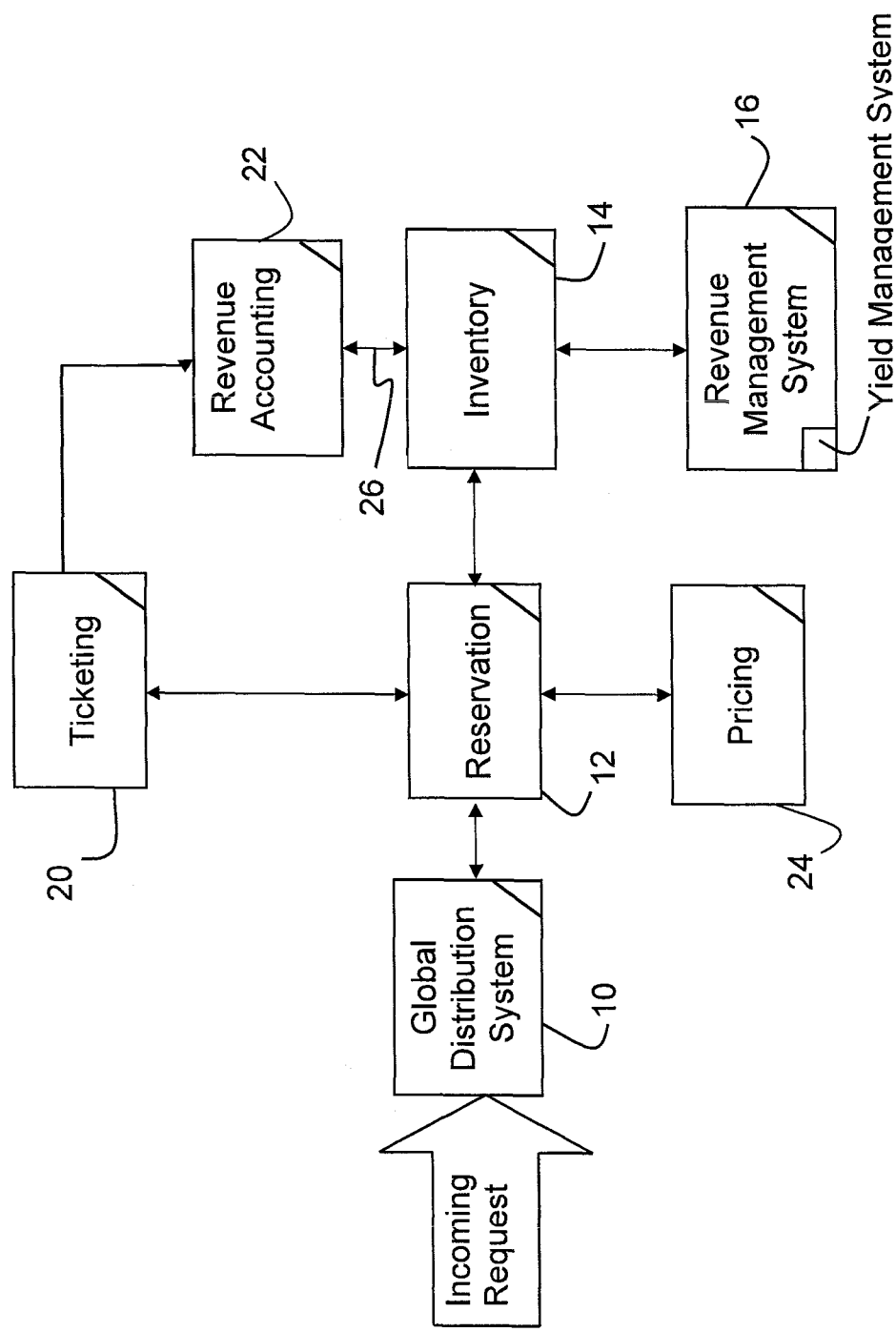
FIG. 2 is a high level block diagram of a process flow and system that responds to an itinerary availability polling request or sell request in an enhanced manner in accordance with this invention, where a communication path is provided between a Revenue Accounting System and an Inventory System that makes an Availability Computation.

The informative pricing inquiry advantageously can be embodied in a fare quotation request sent to the Pricing System 24 (see FIG. 2). The Pricing System 24 may use fare data such as fare rules and fare amounts as a basis of its determination.

In any case the referential data (stored in conjunction with the Referential Data Server 22B) used for the proration (prorate factor, based amounts, ICH rate) will be that data available and effective at the time of Availability Computation, and thus could be different from the proration available at ticketing time.

At the end of the process (either Option A or Option B) the Proration Service 22A returns (23B) to the Availability Computation Engine 14A of the Inventory System 14 an adjusted Yield or an adjustment factor to be applied to the Yield, and the Availability Computation Engine 14A then continues with the Availability Computation process using the Yield as modified by the Proration Service 22A.

For example, assume that a travel agent is booking a travel for a client who wishes to fly from Toulouse to Singapore. The travel agent books a first segment from Toulouse (TLS) to London (LON) with carrier C1, and the travel agent then requests the second part of the travel, LON-SIN with carrier C2.

In this case the Inventory System 14 of carrier C2 is able to recognize that there is a connection with a segment operated by C1, and that the entire travel requested is TLS-SIN. As a result, and in accordance with this invention, the Inventory System 14 of carrier C2 requests, by making the Call 23A, the Yield proration from the Proration Service 22A of carrier C2 with the following exemplary information (which is not intended to be comprehensive):

Entire travel solution: TLS-(C1)-LON-(C2)-SIN
Travel solution being evaluated: LON-(C2)-SIN
Booking classes: Y-Y
Validating carrier: C2→request from a C2 office.
Other informative segments: none available
SSR: none available
Yield value: 1500 EUR The Proration Service 22A of carrier C2 has as the input data (ID) the list of segments to be prorated, i.e., TLS-(C1)-LON-(C2)-SIN, the list of booking classes and a Yield value of 1500 EUR. The Proration Service 22A of carrier C2 applies the proration rules and algorithms applicable to this context and returns a factor of, e.g., 82% to apply to the Yield. The Availability Computation Engine 14A of Inventory System 14 then modifies the Yield according to this information, 1500 EUR×82%=1230 EUR and continues with the ongoing Availability Computation using the adjusted Yield.

One non-limiting advantage of this proration method is that the Proration Service 22A considers all of the available rules (stored at Referential Data Server 22B) that are defined for revenue proration, for instance, the constraints regarding a minimum value to be allocated to a given segment of a determined carrier (provisos), or a minimum ratio to be respected. In addition, all applicable proration methods are available for the Availability Computation process including SPA, Provisos, SRP and/or any special methods defined and stored at the Referential Data Server 22B of the Revenue Accounting System 22. However, and as was noted above, as typically not all relevant information is present during the availability polling request or sell request, the proration is an approximation of what would be done if the itinerary was priced with only the context of Availability Computation by the Inventory System 14.

An aspect of the exemplary embodiments of this invention is the modifications made to both the Inventory System 14 and to the Revenue Accounting System 22 to provide the interface 26B in FIG. 3, the data flow over this interface, and the Proration Engine or Service 22A that is embodied as part of the inventory System 14 in the illustrated case. As was noted previously, conventionally the Inventory System 14 and the Revenue Accounting System 22 operate independently from one another and manipulate completely different units of data, i.e., the Revenue Accounting System 22 operates with fares and taxes whereas the Inventory System 14 manages Yields (there is no consideration of taxes in the Inventory System 14). This invention exploits a common point of interest of these two disparate types of systems, i.e., the proration of a given value according to a bilateral agreement or other rules.

As was noted previously the revenue accounting needs to be able to support a high demand during peak periods, as the Availability Computation process handled by the Availability Calculation Engine 14A may receive some thousands of availability polling request and sell requests per second, with many of these requests requiring proration. The response time is thus important, and the overall proration process should be completed in a short period of time.

The embodiment shown in FIG. 3 most specifically addresses these problems by embedding the proration engine (Proration Service 22A) provided by the revenue accounting in the Inventory System 14 so that the Availability Computation Engine 14A can control the response time. The Proration Service 22A can include the following elements, or these elements can be provided by the Referential Data Server 22B:

a set of libraries, developed and maintained by the Revenue Accounting System 22 and integrated by client applications; and a set of referential data that includes, for example, ICH (IATA Clearing House) 5 day rate exchange rate (IATA standard);

Base Amount and prorate factors (IATA standard);

Provisos definition (IATA standard); and

SPA definition, Bilateral carrier agreements.

Concerning the IATA standard referential data, these are filed and maintained by the Revenue Accounting System 22. This data is fed into Referential Data Server 22B and replicated, using a cache mechanism, onto client applications. The ICH exchange rates are updated monthly whereas the Base Amount/Prorate factors and proviso definition are updated quarterly. Addendum can be issued to update the last referential data and related modifications are performed by Revenue Accounting personnel and fed into the Referential Data Server 22B.

Concerning the SPAs, these are typically maintained by the carrier itself at the Referential Data Server 22B and replicated in a similar manner as the IATA standard referential data.

It can be noted that in practice the Revenue Accounting System 22 and the Inventory System 14 can share the same data processing platform, although this is not a requirement to implement this invention.

As should be realized the Revenue Accounting System 22 and the Inventory System 14 can each comprise at least one data processor operating under control of software instructions stored in at least one memory. The Revenue Accounting System 22 and the Inventory System 14 can be implemented as respective servers co-located at one installation or they may be geographically distributed and interconnected via the integration path 26 via any type of suitable data communication network. Further, in some embodiments the functionality of the Revenue Accounting System 22 and the Inventory System 14 can be integrated into one computing platform. In this case the integration path 26 can be an internal path (e.g., a virtual path) implemented in any suitable manner within the hardware/software architecture of the computing platform. The foregoing applies as well to the Proration Engine or Service 22A, which can be implemented as an integrated module of software instructions or as a standalone server/computing platform.

The foregoing description has provided by way of exemplary and non-limiting is examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent prorating rules and algorithms, and the use of more or less than the described amount and type of referential data may be attempted by those skilled in the art.

Furthermore, the use of these exemplary embodiments is not limited to only the airline industry, but has broader applicability to any type of transportation modalities where a multi-faceted travel solution involves more than one carrier or transportation provider, and where a particular ticket monetary amount needs to be prorated between more than one carrier or transportation provider. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A computer-implemented method to perform a travel-related availability determination, the method comprising:

with at least one processor of an inventory system, initiating an availability computation by retrieving information relevant to a received availability computation inquiry for a travel solution;

determining, with the at least one processor, a portion of the travel solution that corresponds to a reference carrier and a context to be prorated;

calling a proration service and providing the proration service with applicable context information for the portion of the travel solution;

determining proration information for the portion of the travel solution based on proration data maintained by a revenue accounting system;

receiving a response from the proration service that includes the proration information for the portion of the travel solution;

determining, with the at least one processor, an adjusted yield based at least in part on the proration information for the portion of the travel solution; and completing the availability computation, with the at least one processor, using the adjusted yield.

2. The method of claim 1, wherein the reference carrier is a validating carrier.

3. The method of claim 1, wherein the availability computation inquiry is one of an availability polling request and a sell request, and the applicable context information provided to the proration service is comprised of at least one of:

an itinerary;

a booking class, per flight segment;

any applicable special service request information;

a point of sale;

a yield corresponding to the itinerary; and a validating carrier.

4. The method of claim 3, wherein the proration information comprises:

a percentage to be applied to each flight segment of the travel solution; and an absolute value related to each flight segment value, if the yield is present in the context information provided to the proration service.

5. The method of claim 3, wherein the proration service computes, using the context information received from the inventory system, a final yield corresponding to each operating carrier associated with the travel solution by:

applying straight rate proration on the yield and providing a percentage and segment value deduced from the yield;

applying provisos based on the itinerary and the yield; and applying a special prorate agreement based on the context information.

6. The method of claim 5, wherein the proration service computes the proration information using a fare quotation returned by an informative-pricing inquiry and the context information received from the inventory system, the proration service matches provisos and a special prorate agreements based on the fare quotation, and the proration service provides a percentage of the fare quotation assigned to each segment of the travel solution.

7. The method of claim 1, wherein the proration service determines the proration information based on referential data effective at the time of the availability computation inquiry.

8. The method of claim 7, wherein the referential data is obtained from a referential data server that also stores applicable proration rules and agreements.

9. The method of claim 8, wherein the proration service comprises a part of the inventory system, and is connected to the referential data server via a path established between the inventory system and the revenue accounting system.

10. The method of claim 1, wherein calling is performed in real time in response to receiving the availability computation inquiry.

11. A non-transitory computer-readable medium that contains software program instructions, where execution of the software program instructions by at least one processor results in performance of operations that comprise execution of the method of claim 1.

12. A computer-implemented travel reservation and booking system comprising:
an inventory system comprising at least one processor; and
program instructions configured to be executed by the at least one processor to cause the processor to:
initiate an availability computation in response to receiving an availability computation inquiry for a travel solution to retrieve information relevant to the received availability computation inquiry;
determine a portion of the travel solution that corresponds to a reference carrier and a context both to be prorated;
call a proration service and provide the proration service with applicable context information for the portion of the travel solution;
determine proration information for the portion for the travel solution based on proration data maintained by a revenue accounting system;
receive a response from the proration service that includes the proration information;
determine an adjusted yield based at least in part on the proration information for the portion of the travel solution; and
complete the availability computation using the adjusted yield.

13. The travel reservation and booking system of claim 12, wherein the availability computation inquiry is one of an availability polling request and a sell request, and the applicable context information provided to the proration service is comprised of at least one of:
an itinerary;
a booking class, per flight segment;
any applicable special service request information;
a point of sale;
a yield corresponding to the itinerary; and
a validating carrier.

14. The travel reservation and booking system of claim 13, wherein the proration information comprises:
a percentage to be applied to each flight segment of the travel solution; and an absolute value related to each flight segment value, if the yield is present in the context information provided to the proration service.

15. The travel reservation and booking system of claim 13, wherein the proration service computes, using the context information received from the inventory system, a final fare, and a part of the final fare corresponding to each operating carrier by:
applying straight rate proration on the yield and providing a percentage and a segment value deduced from the yield;
applying provisos based on the itinerary and the yield; and
applying a special prorate agreement based on the context information.

16. The travel reservation and booking system of claim 13, wherein the proration service computes the proration information using a fare quotation returned by an informative-pricing inquiry and the context information received from the inventory system, matches provisos and a special prorate agreement based on the fare quotation, and the proration service provides a percentage of the fare quotation assigned to each segment of the travel solution.

17. The travel reservation and booking system of claim 12, wherein the proration service determines the proration information based on referential data effective at the time of the availability computation inquiry.

18. The travel reservation and booking system of claim 17, wherein the referential data is obtained from a referential data server that also stores applicable proration rules and agreements.

19. The travel reservation and booking system of claim 18, wherein the proration service comprises a part of the inventory system, and is connected to the referential data server via a path established between the inventory system and the revenue accounting system.

20. The travel reservation and booking system of claim 12, wherein the reference carrier is a validating carrier.

* * * * *

UNITED STATES PATENT AND TRADEMARK OFFICE
CERTIFICATE OF CORRECTION

PATENT NO. : 8,650,054 B2  Page 1 of 1
APPLICATION NO. : 13/343986
DATED : February 11, 2014
INVENTOR(S) : Sergio Rivas Garay It is certified that error appears in the above-identified patent and that said Letters Patent is hereby corrected as shown below:

In the Claims:

At column 12, claim number 6, line number 66, change "agreements" to --agreement--.

Signed and Sealed this
Nineteenth Day of August, 2014

Michelle K. Lee
*Deputy Director of the United States Patent and Trademark Office*